United States Patent
Nishijima et al.

(10) Patent No.: US 10,124,386 B2
(45) Date of Patent: Nov. 13, 2018

(54) FORM-ROLLING DEVICE

(71) Applicant: NISSHIN STEEL CO., LTD., Chiyoda-ku, Tokyo (JP)

(72) Inventors: Shinnosuke Nishijima, Tokyo (JP); Kouki Tomimura, Tokyo (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

(21) Appl. No.: 15/558,442

(22) PCT Filed: Mar. 9, 2016

(86) PCT No.: PCT/JP2016/057381
§ 371 (c)(1),
(2) Date: Sep. 14, 2017

(87) PCT Pub. No.: WO2016/147982
PCT Pub. Date: Sep. 22, 2016

(65) Prior Publication Data
US 2018/0065163 A1 Mar. 8, 2018

(30) Foreign Application Priority Data
Mar. 18, 2015 (JP) ................. 2015-054191

(51) Int. Cl.
*B21D 17/04* (2006.01)
*B21D 41/02* (2006.01)
(Continued)

(52) U.S. Cl.
CPC ............. *B21D 17/04* (2013.01); *B21D 15/06* (2013.01); *B21D 17/00* (2013.01); *B21D 41/02* (2013.01); *F16L 21/06* (2013.01)

(58) Field of Classification Search
CPC ........ B21D 17/04; B21D 41/02; B21D 15/06; B21D 17/00
(Continued)

(56) References Cited

U.S. PATENT DOCUMENTS 6,244,088 B1 6/2001 Compton
2006/0185414 A1\* 8/2006 Shohara ................. B21D 17/04
72/84

FOREIGN PATENT DOCUMENTS

CN 203862786 U 10/2014
JP H11207410 A 8/1999
(Continued)

OTHER PUBLICATIONS

International Search Report corresponding to Application No. PCT/JP2016/057381; dated Apr. 19, 2016.
(Continued)

*Primary Examiner* — David B Jones
(74) *Attorney, Agent, or Firm* — Cantor Colburn LLP

(57) ABSTRACT

A form-rolling device for processing a tubular member may include a shaft rotatable around a first axis, a first grooving portion that protrudes from an outer circumference of the shaft; a second grooving portion that is rotatable around a second axis parallel to the first axis; a flange-shaped tube-end positioning member that is attached to a position of the outer circumference of the shaft nearer to a base end than the first grooving portion, and a supporting member that supports an outer circumference of a ring member held on an outer circumference of the tubular member.

8 Claims, 12 Drawing Sheets

(51) Int. Cl.
*B21D 17/00* (2006.01)
*B21D 15/06* (2006.01)
*F16L 21/06* (2006.01)

(58) Field of Classification Search
USPC .................. 72/105, 106, 370.2, 370.21, 101
See application file for complete search history.

(56) References Cited

FOREIGN PATENT DOCUMENTS

| JP | H11314120 A | 11/1999 |
|----|-------------|---------|
| JP | 2000210723 A | 8/2000 |
| JP | 2013103237 A | 5/2013 |
| JP | 6029798 B1 | 11/2016 |

OTHER PUBLICATIONS

SIPO Office Action corresponding to Application No. 201680015089. 6; dated Apr. 4, 2018.

* cited by examiner

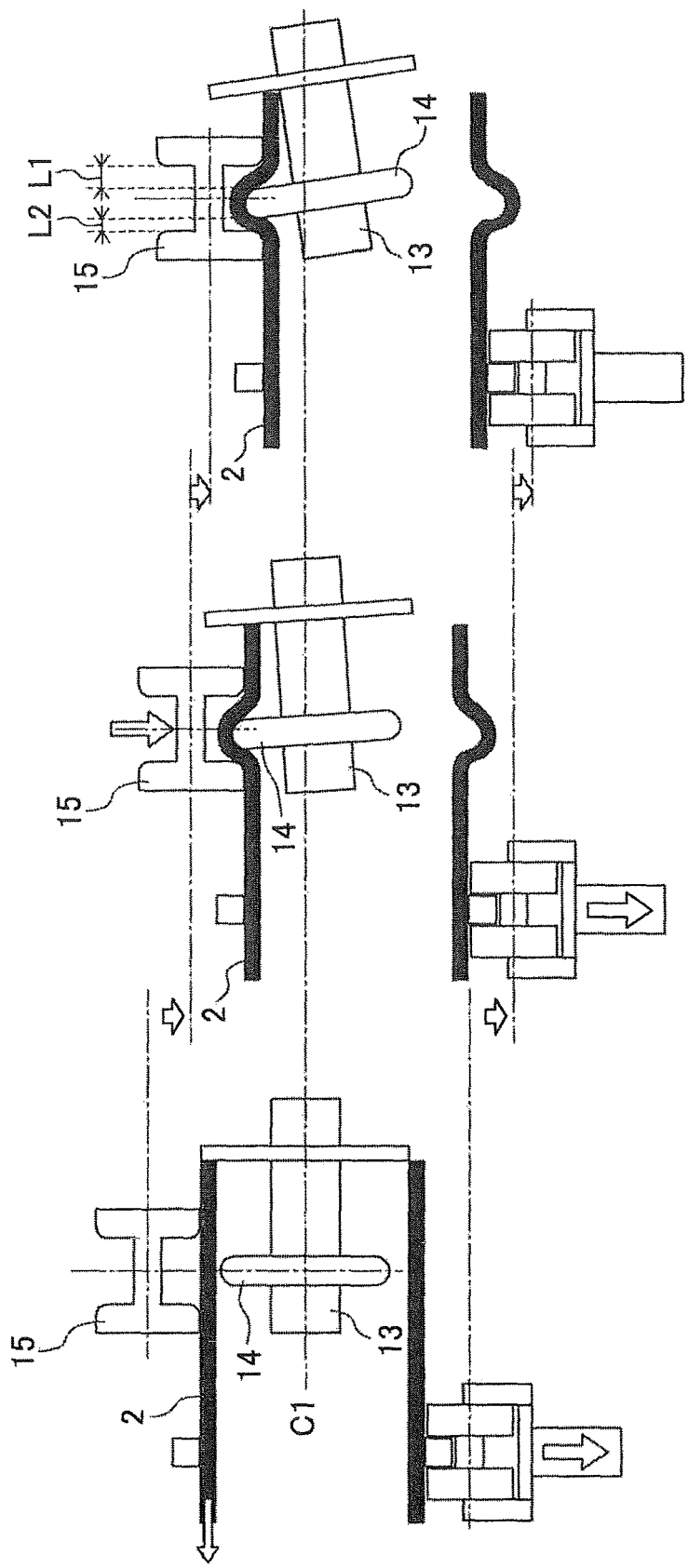

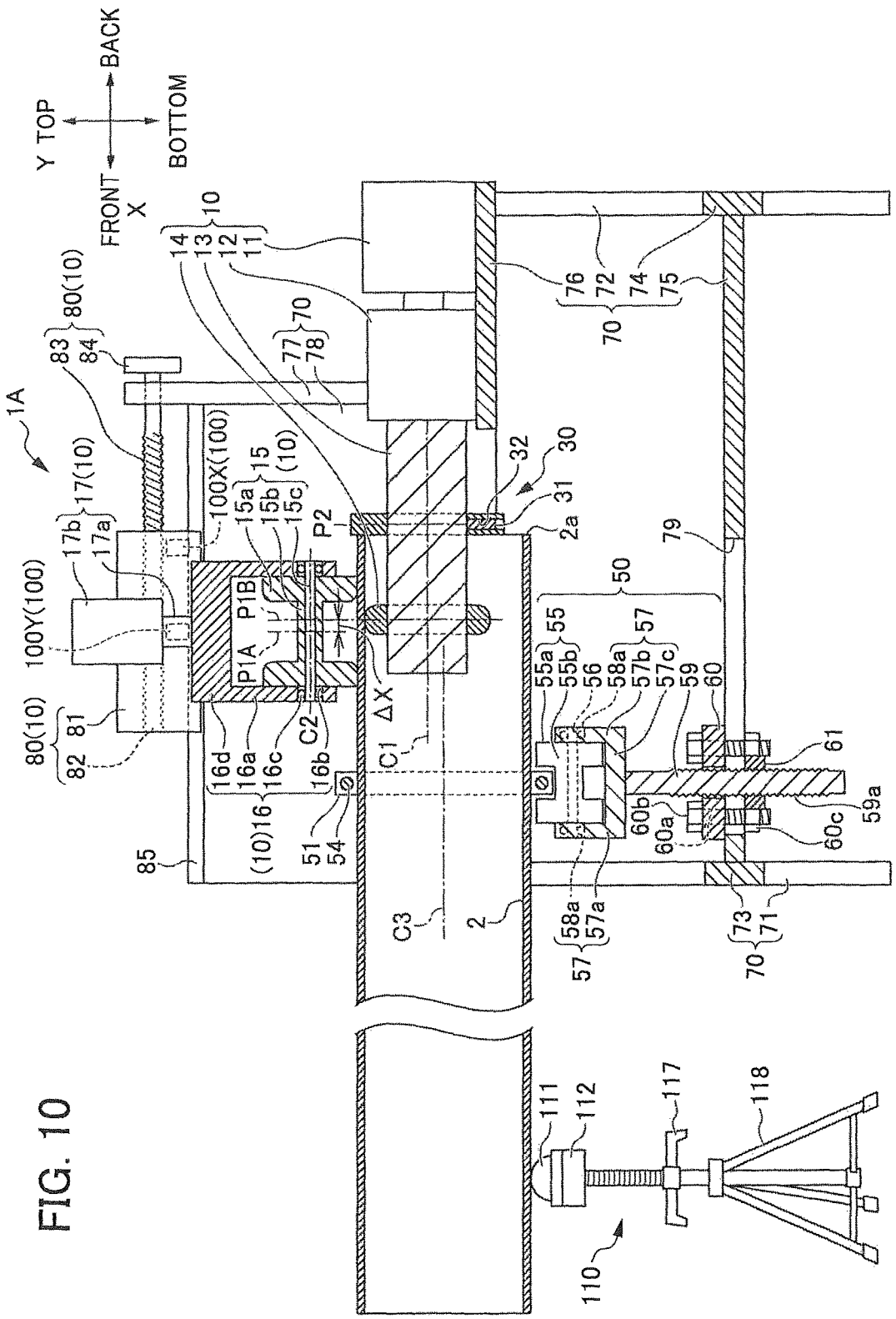

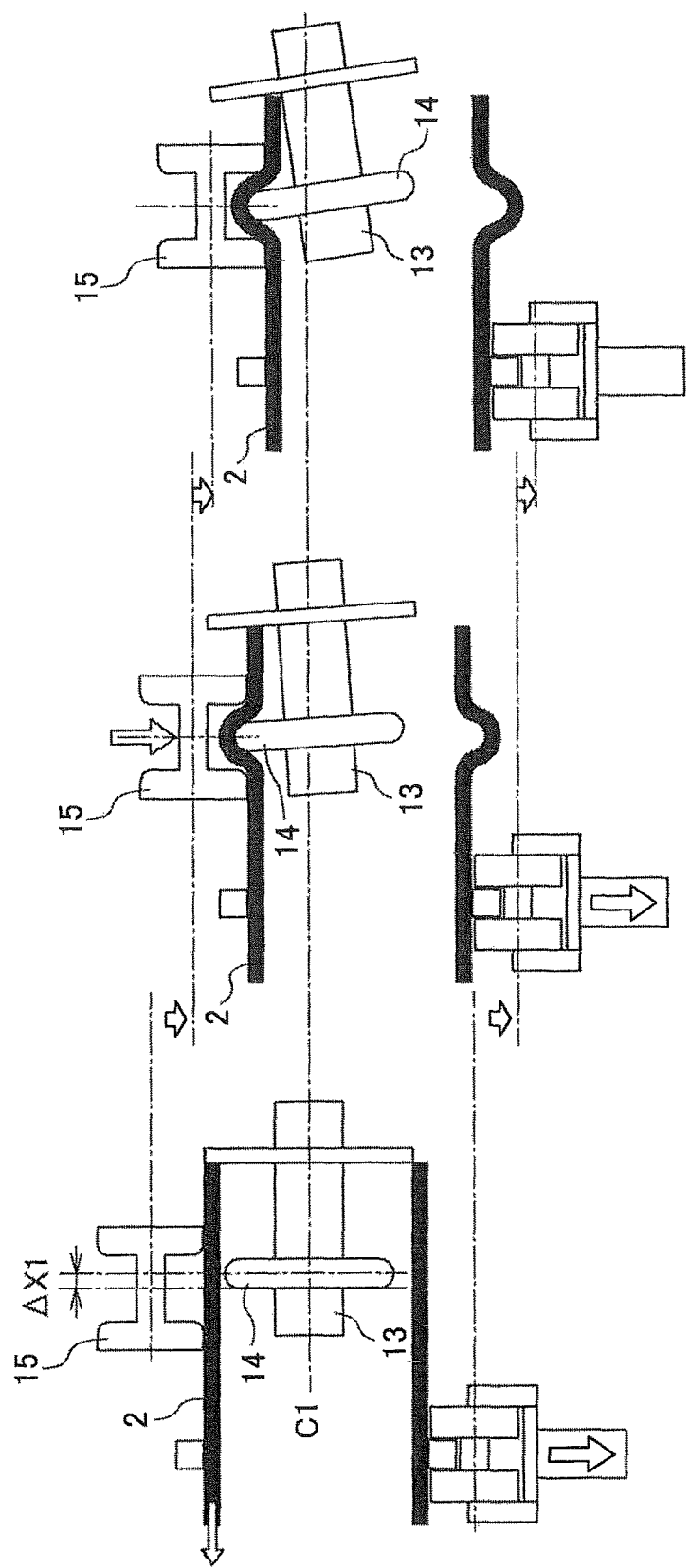

FORM-ROLLING DEVICE

CROSS REFERENCE TO RELATED APPLICATIONS

This is the U.S. national stage of application No. PCT/JP2016/057381, filed on Mar. 9, 2016. Priority under 35 U.S.C. § 119(a) and 35 U.S.C. § 365(b) is claimed from Japanese Application No. 2015-054191, filed on Mar. 18, 2015, the disclosures of which are also incorporated herein by reference.

TECHNICAL FIELD

The present invention relates to a form-rolling device that forms a groove on a tubular member that is to be processed.

BACKGROUND ART

Ductile iron pipes have often been used for plumbing. Such a ductile iron pipe is made by casting, and thus has a lot of flexibility in shape. Thus, there are a wide variety of joints, and each joint is used in a right place.

On the other hand, there are stainless steel (SUS) pipes for plumbing. However, it is not easy to process the joints for such SUS pipes. Thus, only SUS pipes with a specific diameter are used. Hereinafter, such a stainless steel pipe for plumbing will be referred to as an SUS tube. However, such SUS tubes have a useful life longer than ductile iron pipes. Furthermore, such an SUS tube reduces problems such as red or green rusty water and prevents stress corrosion cracking at room temperatures, and thus has a low running cost. Thus, there is a need for the use of SUS tubes of various diameters.

In order to connect SUS tubes, grooves are formed on the outer circumferences of the ends of two tubes to be connected, and a joint, which is to engage with the grooves, is attached to the tubes.

A form-rolling device is proposed as a device for forming such grooves. The form-rolling device includes: a drive transmitting mechanism embedded in a casing and including a rotation output unit; an electric motor that drives the drive transmitting mechanism; a driving roller attached along the inner surface of the tube and including a whole circumferential groove; a grooving roller pressed toward the driving roller while holding the tube between the grooving roller and the driving roller, and including a whole circumferential projecting part; a trajectory ring fixed on the tube and including a trajectory surface perpendicular to the axis of the tube; and a movable roller attached to the casing so as to be movable on the whole circumference of the tube along the trajectory surface (see Patent Literature 1).

Patent Document 1: Japanese Unexamined Patent Application, Publication No. 2013-103237

DISCLOSURE OF THE INVENTION

Problems to be Solved by the Invention

The form-rolling device is designed to target tubes with a certain tube size, and forms a groove at a position a certain distance away from the tube end. SUS tubes with various diameters are expected to be used in the future as described above. SUS tubes with different diameters have different distances between the grooves and the tube ends. Thus, it may be impossible to use the existing form-rolling devices.

An objective of the present invention is to provide a form-rolling device applicable to tubular members to be processed of various sizes and capable of forming a groove at an arbitrary position away from the tube end.

Means for Solving the Problems

An embodiment of the present invention provides a form-rolling device for processing a tubular member, the device comprising: a shaft rotatable around a first axis; a first grooving portion that protrudes from an outer circumference of the shaft outwardly along a circumference around the first axis, and has an outward convex cross-sectional shape taken along a plane including the first axis; a second grooving portion that is rotatable around a second axis parallel to the first axis, has a concave cross-sectional shape taken along a plane passing through the first axis and the second axis, is capable of being placed at a position corresponding to the first grooving portion in the direction along the first axis, and is capable of moving in a direction in which the second grooving portion approaches or departs from the first grooving portion; a flange-shaped tube-end positioning member that is attached to a position of the outer circumference of the shaft nearer to a base end than the first grooving portion, and is capable of changing a distance from the first grooving portion in a direction along the first axis; and a supporting member that supports an outer circumference of a ring member held on an outer circumference of the tubular member to be processed so that the ring member is able to rotate around a third axis, and the third axis is an axis of the tubular member.

In addition, the supporting member may include a concave supporting roller that holds the ring member.

In addition, the supporting roller may be capable of moving up and down, and may be provided at two or more places in a circumferential direction of the ring member.

In addition, the supporting roller may be capable of moving in a direction in which the supporting roller approaches or departs from the tube-end positioning member.

In addition, the tube-end positioning member may be capable of moving on the outer circumference of the shaft in the direction along the first axis.

In addition, a relative position of a center of the concave shape of the second grooving portion in the direction along the first axis relative to a center of the convex shape of the first grooving portion in the direction along the first axis is capable of being changed in the direction along the first axis.

The form-rolling device may further include a position detecting device that is capable of measuring the relative position between the second grooving portion and the first grooving portion.

In addition, the ring member is detachable from the tubular member.

Effects of the Invention

According to the present invention, a form-rolling device applicable to tubular members to be processed of various sizes and capable of forming a groove at an arbitrary position away from the tube end is provided.

BRIEF DESCRIPTION OF THE DRAWINGS

FIG. 6A is an explanatory diagram of a phenomenon that may occur when the center of a concave roller is in agreement with the center of the convex roller.

FIG. 6B is an explanatory diagram of a phenomenon that may occur when the center of a concave roller is in agreement with the center of the convex roller.

FIG. 6C is an explanatory diagram of a phenomenon that may occur when the center of a concave roller is in agreement with the center of the convex roller.

FIG. 10 is a schematic cross-sectional view of a form-rolling device according to a second embodiment.

FIG. 13A is an explanatory diagram of the operation of the form-rolling device in a form-rolling process according to the second embodiment.

FIG. 13B is an explanatory diagram of the operation of the form-rolling device in a form-rolling process according to the second embodiment.

FIG. 13C is an explanatory diagram of the operation of the form-rolling device in a form-rolling process according to the second embodiment.

PREFERRED MODE FOR CARRYING OUT THE INVENTION

First Embodiment

A first embodiment of a form-rolling device 1 according to the present invention will be described hereinafter with reference to the appended drawings. The form-rolling device 1 of the present embodiment holds and rotates a tubular member to be processed (tube 2 to be processed) between a convex roller (first grooving portion) 14 and a concave roller (second grooving portion) 15 that are grooving dies so as to form a groove on the tube 2 with a "plastic forming process" using the plasticity of a metal.

Figure 1:
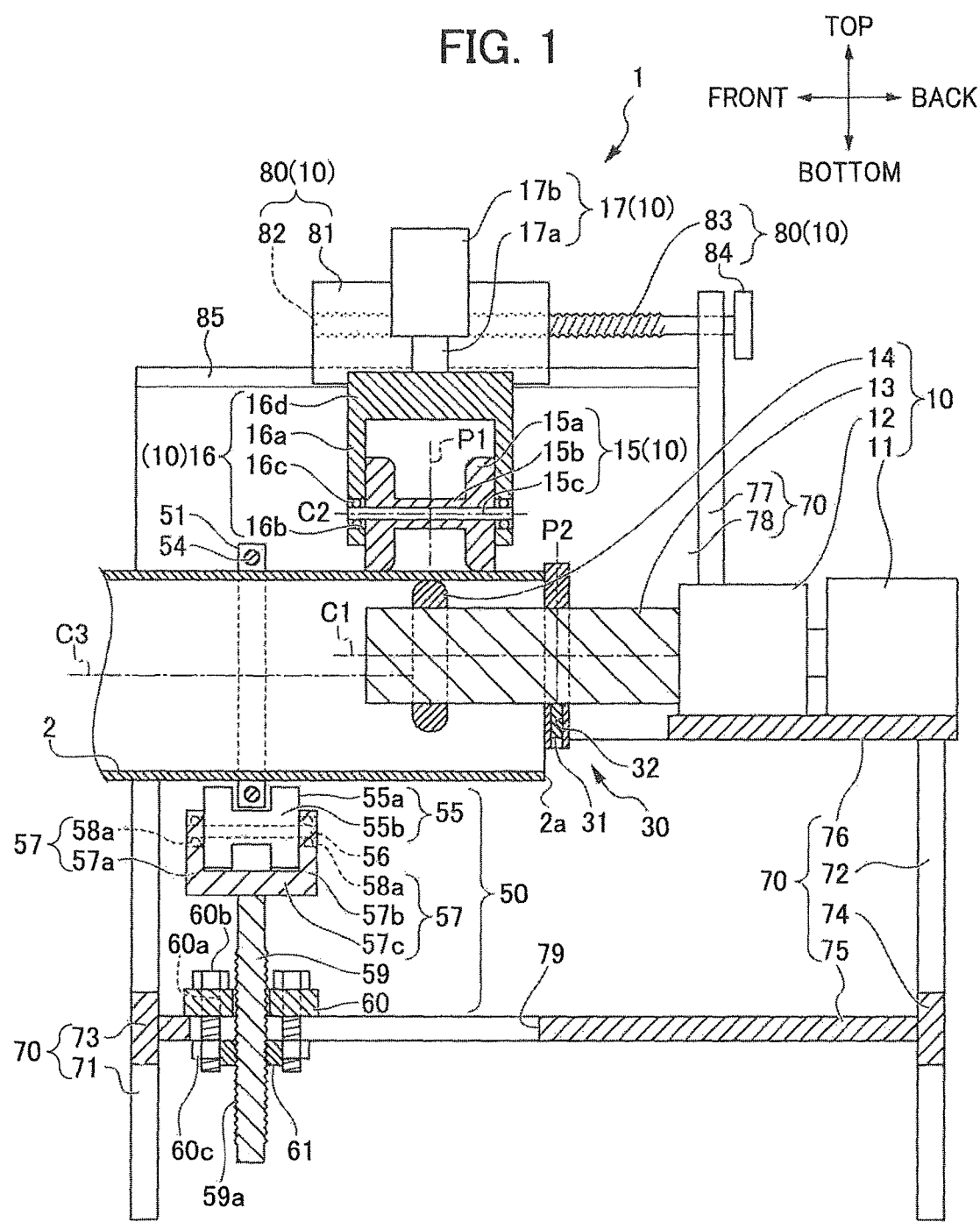
FIG. 1 is a schematic cross-sectional view of a form-rolling device according to an embodiment of the present invention.

FIG. 1 is a schematic cross-sectional view of the form-rolling device 1 according to the first embodiment of the present invention, taken along a first axis C1 to be described below. Note that FIG. 1 is simplified for description and is not an accurate cross-sectional view.

As illustrated, the direction along the first axis C1 of a shaft portion 13 is the longitudinal direction. The side on which the tube 2 is attached is the front and the opposite side is the back. In addition, the direction in which the top and bottom of the form-rolling device 1 are arranged is the vertical direction.

Figure 2:
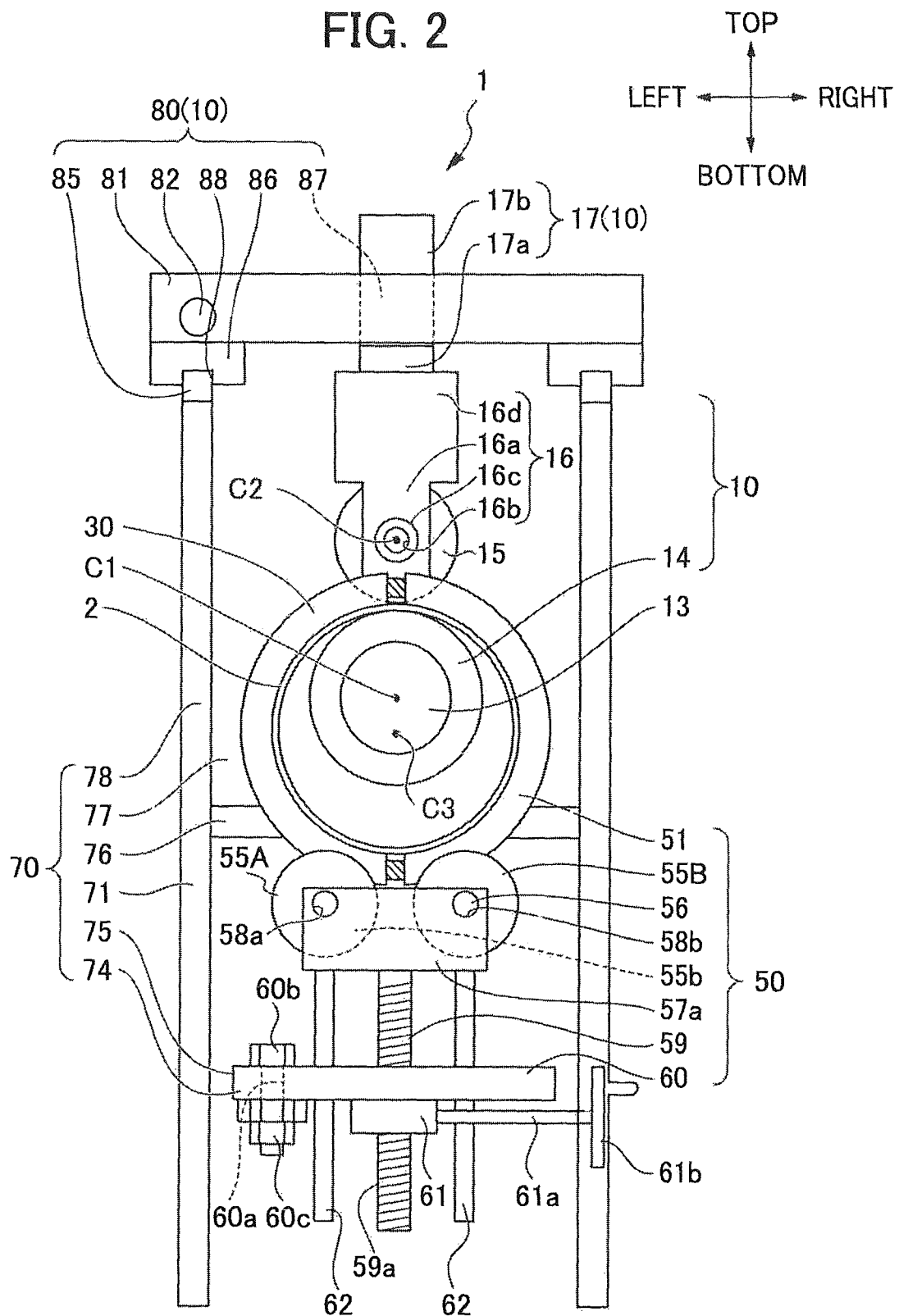
FIG. 2 is a conceptual diagram of the form-rolling device, viewed from the front.

FIG. 2 is a conceptual diagram of the form-rolling device 1, viewed from the front. As illustrated, the direction perpendicular to the longitudinal direction and the vertical direction is the horizontal direction.

The form-rolling device 1 includes a grooving mechanism 10, a tube-end positioning member 30 that positions a tube end 2a of the tube 2, and a tube supporting mechanism 50 that supports the tube 2. The whole form-rolling device 1 is fixed on a frame 70.

(Frame)

The frame 70 of the form-rolling device 1 will be described first.

The frame 70 includes: two front leg portions 71 and two back leg portions 72 provided at both longitudinal ends of the form-rolling device 1, respectively; a front board portion 73 that is horizontally laid across the two front leg portions; a back board portion 74 that is horizontally laid across the two back leg portions 72; and a grooved board portion 75 that is longitudinally laid across the front board portions 73 and the back board portions 74.

A thin and long slide guide groove 79 is formed on the grooved board portion 75 in the longitudinal direction as illustrated. The slide guide groove 79 penetrates the horizontal center of the grooved board portion 75.

The frame 70 further includes: a fixing stage 76 on which a drive motor 11 to be described below is fixed; a holding board 77 extending upwardly from the front side of the fixing stage 76; and rail holding walls 78 provided on the right and left sides of the holding board 77.

(Grooving Mechanism)

The grooving mechanism 10 includes a drive motor 11, a shaft portion 13 connected to a rotary shaft of the drive motor 11 and held on the fixing stage 76 with a bearing portion 12 enabling the shaft portion 13 to rotate; and a convex roller 14 provided on the outer circumference on the front side of the shaft portion 13.

(Shaft)

The shaft portion 13 is formed as a circular cylinder and rotates around the first axis C1.

The base end of the shaft portion 13 is attached to the rotary shaft of the drive motor 11 via the bearing portion 12 fixed on the fixing stage 76 as described above.

(Convex Roller)

The convex roller 14 is formed into an annular shape around the first axis C1 on the outer circumference of the shaft portion 13. The convex roller 14 may be held on the outer circumference of the shaft portion 13 as a separate portion, or may be integrated with the shaft portion 13.

The cross-sectional surface of the convex roller 14 in the longitudinal direction preferably has a semicircular shape protruding outwards from the shaft portion 13 as illustrated in FIG. 1.

The grooving mechanism 10 further includes a concave roller 15 and a concave roller holding unit 16 that are placed on the upper side of the convex roller 14, and a cylinder 17 that moves the concave roller 15 and the concave roller holding unit 16 up and down.

(Concave Roller)

As illustrated in FIG. 1, the concave roller 15 is a member having a structure in which a circular cylinder 15b is placed between two circular disks 15a and having a cross-sectional surface that is roughly H-shaped in the longitudinal direction.

A rotary shaft 15c is inserted in the center of the concave roller 15 along a second axis C2, and both ends of the rotary shaft 15c protrude from the circular disks 15a.

The concave roller 15 and the convex roller 14 form a groove on the tube 2 by holding the tube 2 between the concave roller 15 and the convex roller 14.

(Concave Roller Holding Unit)

The concave roller holding unit 16 is a structure in which two rectangular holding boards 16a extend downwards from both longitudinal ends of a rectangular body portion 16d. The concave roller holding unit 16 has a cross-sectional surface that is rectangular U-shaped as illustrated in FIG. 1.

Each of the holding boards 16a includes a hole 16b. A bearing 16c is placed in the hole 16b. The rotary shaft 15c of the concave roller 15 is inserted in the bearing 16c. This insertion enables the concave roller 15 to rotate in the concave roller holding unit 16 in synchronization with the rotation of the shaft portion 13 and the tube 2.

A cylinder rod 17a of the cylinder 17 is attached on the upper side of the concave roller holding unit 16. A piston (not illustrated) is placed in the cylinder tube 17b of the cylinder 17. Moving the piston up and down in the cylinder tube 17b also moves the cylinder rod 17a extending from the piston up and down.

The form-rolling device 1 further includes a moving mechanism 80 to longitudinally move the grooving mechanism 10 via the cylinder 17.

The moving mechanism 80 includes a moving block 81 holding the cylinder 17, a ball screw 83 penetrating an insertion screw hole 82 provided in a moving block 81, a handle 84 rotates the ball screw 83, and a rail 85 for sliding the moving block 81.

The moving block 81 is a thick rectangular board and includes the insertion screw hole 82 longitudinally penetrating the moving block 81. Slide units 86 are attached on the right and left edges of the lower surface of the moving block 81. An opening portion 87 is provided at the center of the moving block 81.

The cylinder 17 is fitted and fixed in the opening portion 87.

The insertion screw hole 82 is provided on the left side of the moving block 81 in the present embodiment. The inner circumference of the insertion screw hole 82 is threaded. The ball screw 83 is inserted in the insertion screw hole 82.

The rail 85 is attached on the upper side of the rail holding wall 78 on the frame 70. A slide guide groove 88 is provided on the lower surface of the slide unit 86. The rail 85 is inserted in the slide guide groove 88.

Rotating the handle 84 attached to an end of the ball screw 83 rotates the ball screw 83. This rotation longitudinally moves the moving block 81.

(Tube-End Positioning Member)

An annular tube-end positioning member 30 is placed on the shaft portion 13 between the convex roller 14 and the bearing portion 12. The tube-end positioning member 30 is an annular board member having a predetermined thickness.

The inner diameter of the tube-end positioning member 30 is approximately identical to the outer diameter of the shaft portion 13. The tube-end positioning member 30 is held on the outer circumference of the shaft portion 13. The outer diameter of the tube-end positioning member 30 has a length longer than the length that is the sum of the thickness of the tube 2 and the outer diameter of the convex roller 14.

The tube-end positioning member 30 is provided with a penetration screw hole 32 extending from the outer circumference to the inner circumference of the tube-end positioning member 30. A long screw 31 is screwed into penetration screw hole 32.

The tube-end positioning member 30 is held on the outer circumference of the shaft portion 13. Screwing the long screw 31 from the penetration screw hole 32 presses the long screw 31 onto the shaft portion 13. This pressure can fix the tube-end positioning member 30 on the shaft portion 13.

On the other hand, unscrewing the long screw 31 can move the tube-end positioning member 30 to an arbitrary position of the shaft portion 13 in the longitudinal direction (in the front and back direction).

In other words, the interval between the tube-end positioning member 30 and the convex roller 14 can be arbitrarily adjusted.

(Tube Supporting Mechanism)

The tube supporting mechanism 50 includes: a ring member 51 held on the outer circumference of the tube 2; a supporting roller 55 rotatably supporting the ring member 51; and a roller supporting unit 57 rotatably supporting the supporting roller 55.

(Ring Member)

Figure 3A:
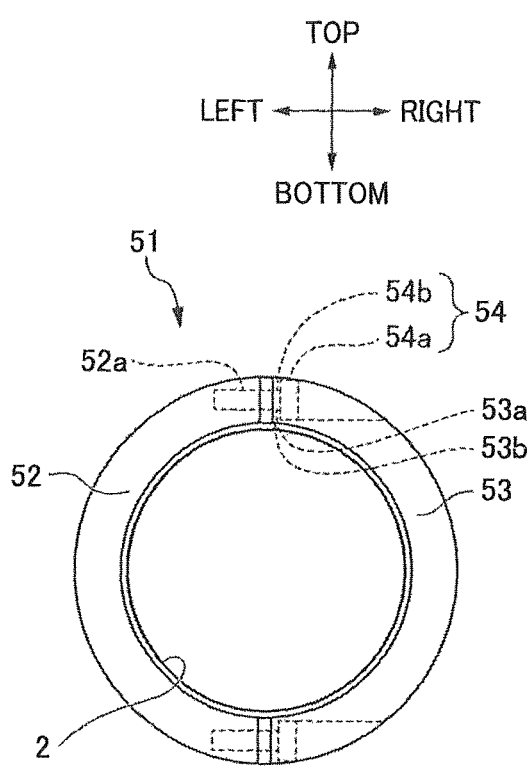
FIG. 3A is a front elevation of a ring member.
Figure 3B:
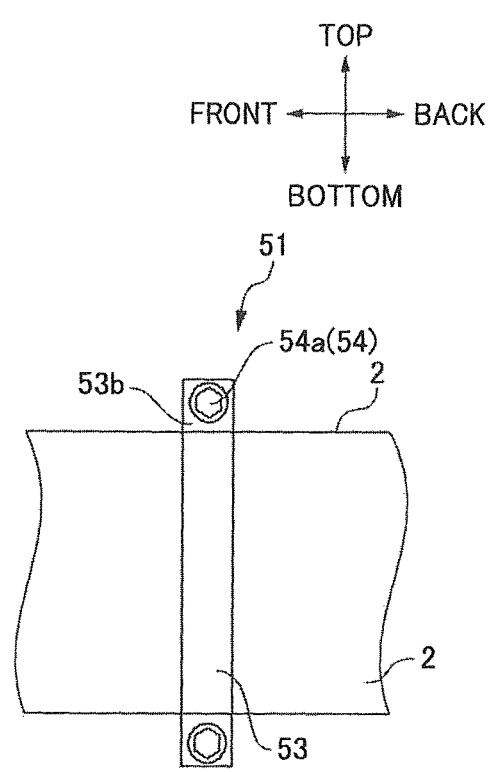
FIG. 3B is a side view of a ring member.

FIG. 3A is a front elevation of the ring member 51, and FIG. 3B is a side view of the ring member 51.

As illustrated, the ring member 51 is a member held on the outer circumference of the tube 2. The ring member 51 is divided into two semicircular portions 52 and 53. The semicircular portions 52 and 53 are connected with bolts 54.

A first end of the semicircular portion 52 is provided with a bolt hole 52a.

A second end of the semicircular portion 53 is cut so as to form a wall 53b provided with a hole 53a that the head 54a of the bolt 54 does not penetrate but the thread portion 54b of the bolt 54 does penetrate.

The ring member 51 has an inner diameter approximately identical to the outer diameter of the tube 2. Inserting the bolt 54 from the hole 53a of the wall 53b of the semicircular portion 53 and screwing the bolt 54 into the bolt hole 52a of the first end of the semicircular portion 52 can fix the ring member 51 to the tube 2.

A plurality of ring members 51 is prepared for the tubes 2 with different outer diameters. The ring members 51 can be exchanged depending on the dimensions of the tube 2.

(Supporting Roller)

Two supporting rollers 55 (a first supporting roller 55A and a second supporting roller 55B) for supporting the ring member 51 upwards are provided around the ring member 51.

As illustrated in FIG. 1, each of the supporting rollers 55 has a structure in which a circular cylinder member 55b is placed between the two disks 55a, and has an H-shaped cross-sectional surface.

A rotary shaft 56 is inserted at the center of the supporting roller 55 and both ends of the rotary shaft 56 protrude from the two disks 55a.

(Roller Supporting Unit)

The roller supporting unit 57 has a structure in which a rectangular bottom panel 57c is placed between the bottom sides of two rectangular side panels having an identical shape (a first side panel 57a and a second side panel 57b) and the first side panel 57a and the second side panel 57b are connected with the bottom panel 57c. The cross-sectional surface of the roller supporting unit 57 has a rectangular U-shape as illustrated in FIG. 1.

Each of the first side panel 57a and the second side panel 57b is provided with two holes 58 (a first hole 58a and a second hole 58b) as illustrated in FIG. 2.

One of the protruding portions of the rotary shaft 56 of the first supporting roller 55A is inserted into the first hole 58a of the first side panel 57a of the roller supporting unit 57. The other protruding portion of the rotary shaft 56 of the first supporting roller 55A is inserted into the first hole 58a of the second side panel 57b.

Similarly, one of the protruding portions of the rotary shaft 56 of the second supporting roller 55B is inserted into the second hole 58b of the first side panel 57a of the roller supporting unit 57. The other protruding portion of the rotary shaft 56 of the second supporting roller 55B is inserted into the second hole 58b of the second side panel 57b.

This insertion enables the first supporting roller 55A and the second supporting roller 55B to rotate on the roller supporting unit 57 and can rotatably hold the ring member 51.

(Circular Cylinder Member)

The roller supporting unit 57 is held by a circular cylinder member 59. A threaded portion 59a is formed on the outer circumference of the circular cylinder member 59.

The circular cylinder member 59 penetrates a rectangular slide portion 60, and further penetrates the slide guide groove 79 of the grooved board portion 75.

The left end of the slide portion 60 is provided with two bolt holes 60a. The bolt head of the bolt 60b inserted in the bolt hole 60a is held on the upper surface of the slide portion 60, and the threaded portion of the bolt 60b is inserted into the slide portion 60 and the slide guide groove 79 of the grooved board portion 75.

A nut 60c with a diameter larger than the lateral width of the slide guide groove 79 is screwed into the threaded portion from the lower surface of the grooved board portion 75. Tightening the nut 60c fixes the slide portion 60 to the grooved board portion 75. Loosening the nut 60c enables the slide portion 60 to move longitudinally along the slide guide groove 79. This movement enables the supporting roller 55 and the roller supporting unit 57 to move longitudinally.

A screw jack 61 is placed on a part of the circular cylinder member 59 that is lower than the slide portion 60. A rotation control shaft 61a extends horizontally from the screw jack 61, and a handle 61b is attached to the tip of the rotation control shaft 61a.

Rotating the handle 61b rotates a gear in the screw jack 61. This rotation moves the circular cylinder member 59 up and down. With the up and down movement of the circular cylinder member 59, a supporting structure placed above the circular cylinder member 59 also moves up and down.

Note that two guides 62 extend downwards from the roller supporting unit 57 and are inserted in the slide portion 60 so as to prevent the roller supporting unit 57 from rotating or inclining.

(Description of Operation)

The operation of the form-rolling device 1 according to the present embodiment will be described next.

1) First, the handle 84 is rotated, and the rotation moves the moving block 81 in the longitudinal direction. Then, the longitudinal position of the concave roller 15 is adjusted so that the center (longitudinal center) of the concave roller 15 is in agreement with the center (longitudinal center) of the convex roller 14.

2) The tube-end positioning member 30 is slid on the outer circumference of the shaft portion 13 to a first position P2 where the distance between the tube-end positioning member 30 and the center P1 of the convex roller 14 is identical to the distance between the tube end 2a of the tube 2 and the form-rolling process position of the tube 2 on which a groove is formed.

The long screw 31 is screwed from the penetration screw hole 32 of the tube-end positioning member 30 at the first position P2, and the long screw 31 is pressed onto the shaft portion 13. This pressure fixes the tube-end positioning member 30 to the first position P2 that is the desired position on the shaft portion 13.

3) A ring member 51, which has an inner diameter suiting the outer diameter of the tube 2 on which a groove is to be formed, is selected. Then, the two semicircular portions 52 and 53 of the ring member 51 are placed on the outer circumference of the tube 2. The bolt 54 is inserted from the hole 53a on the wall 53b of the semicircular portion 53 and screwed into the bolt hole 52a on the first end of the semicircular portion 52. This insertion fixes the ring member 51 to the tube 2.

4) Next, the convex roller 14 is put on the tube 2, and the tube end 2a of the tube 2 is brought into contact with the tube-end positioning member 30. This places the form-rolling process position of the tube 2 at the center P1 of the convex roller 14 and the concave roller 15.

5) The bolt 60b of the slide portion 60 is loosened, and the slide portion 60 is slid along the slide guide groove 79. The longitudinal positions of the supporting rollers 55 are adjusted so that the concave supporting portions on the circular cylinder members 55b of the first supporting roller 55A and the second supporting roller 55B of the supporting rollers 55 are put at the position of the ring member 51 held on the tube 2.

6) The handle 61b of the screw jack 61 is rotated, and the rotation adjusts the vertical position of the supporting roller 55 so that the ring member 51 enters the concave supporting portions of the supporting rollers 55. This adjustment maintains the tube 2 in a horizontal position.

Then, the slide portion 60 is slid along the slide guide groove 79 again, and the tube 2 is pressed so that the tube end 2a of the tube 2 is brought into contact with the tube-end positioning member 30. This slightly adjusts the tube 2 in the longitudinal direction. The bolt 60b is tightened while the tube 2 is maintained at the adjusted position. This tightening fixes the slide portion 60, in other words, the longitudinal position of the ring member 51 and the tube 2.

The preparation for the form-rolling process is completed with the procedures described above.

Figures 4A, 4B, 4C:
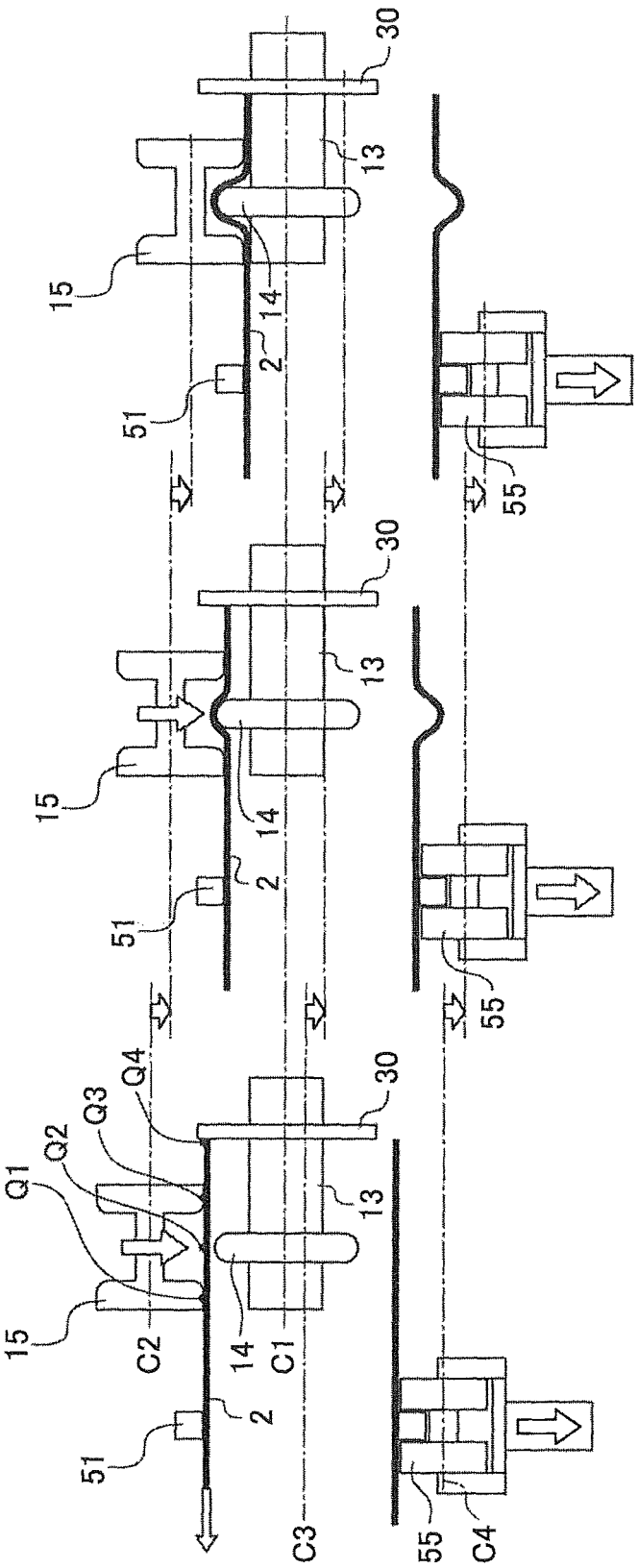
FIG. 4A is an explanatory diagram of the operation in a form-rolling process.
FIG. 4B is an explanatory diagram of the operation in a form-rolling process.
FIG. 4C is an explanatory diagram of the operation in a form-rolling process.

7) The form-rolling process for forming a groove on the tube 2 is performed next. FIGS. 4A, 4B, and 4C is an explanatory diagram of the operation in the form-rolling process.

To perform the form-rolling process, the cylinder 17 is activated so that the cylinder rod 17a and the concave roller 15 descend and the concave roller 15 is brought into contact with the outer circumference of the tube 2 (the state illustrated in FIG. 4A).

8) While the drive motor 11 is activated and the shaft portion 13 and the convex roller 14 provided on the outer circumference of the shaft portion 13 are rotated, the concave roller 15 descends further in the direction in which the concave roller 15 approaches the convex roller 14.

When the concave roller 15 descends further after the concave roller 15 is in contact with the tube 2, the concave roller 15 presses the wall surface of the tube 2 inwardly at contact points Q1 and Q3 at which the concave roller 15 is in contact with the tube 2. At the same time, the vertical position of contact point Q2 at which the convex roller 14 is in contact with the tube 2 is not changed. Thus, the convex portion 20 is formed on the wall surface of the tube 2 as illustrated in FIG. 4B.

The shaft portion 13 rotates around the first axis C1. The convex roller 14 also rotates in synchronization with this rotation, and then the tube 2 also rotates around a third axis C3 that is the center of the tube 2. This rotation forms the convex portion 20 on the whole circumference of the tube 2 as a groove.

9) When the groove is formed with the descent of the concave roller 15, the tube 2 also descends by a depth approximately identical to the depth of the groove. (A decrease in thickness of the tube 2 is generated. Thus, the depth of the groove is not exactly identical to the amount of descent of the tube 2.) To maintain the tube 2 in a horizontal position, the screw jack 61 is rotated again so as to make a fourth axis C4 descend that is the central axis of the supporting roller 55. This descent adjusts the height of the supporting roller 55 as illustrated in FIGS. 4A, 4B and 4C.

10) The descent of the concave roller 15 and the adjustment of the height of the supporting roller are performed until the depth of the groove on the tube 2 reaches a desired depth (FIG. 4C). Note that even if the adjustment of the height of the supporting roller 55 does not correspond to the pressure and linear movement of the concave roller 15, the longitudinal position of the tube end can be determined unless the tube-end positioning member 30 is disengaged from the tube end. Once the whole circumferential convex portion 20 is formed to some extent, the convex roller 14 and the concave roller 15 hold the tube 2 therebetween and the whole circumferential convex portion 20 also works as a guide. Thus, if the supporting rollers 55 are removed from the ring member 51, the groove can still be formed.

The form-rolling process is terminated when the depth of the groove reaches the desired depth.

As described above, the form-rolling device 1 according to the present embodiment has the following effects.

(1) The form-rolling device 1 includes: the shaft portion 13 capable of rotating around the first axis C1; the convex roller 14 that protrudes outwards along the circumference around the first axis C1 and from the outer circumference of the shaft portion 13, and has a outwardly convex cross-sectional shape taken along a plane including the first axis C1; and the concave roller 15 that is capable of rotating around the second axis C2 parallel to the first axis C1, has a concave cross-sectional shape taken along a plane including the first axis C1 and the second axis C2, capable of being placed at the same position as the convex roller 14 in the direction along the first axis C1, and capable of moving in the direction in which the concave roller 15 approaches or departs from the convex roller 14.

Thus, making the concave roller 15 approach the convex roller 14 while the tube 2 is held between the concave roller 15 and the convex roller 14 can form the convex portion 20 on the tube 2.

Then, rotating the convex roller 14 extends the convex portion 20 formed on the tube 2 over the tube 2. This forms a groove.

(2) The form-rolling device 1 further includes: the flange-shaped tube-end positioning member 30 attached on the side of the outer circumference of the shaft portion 13 nearer to the base end of the shaft portion 13 than the convex roller 14, and which is capable of changing the distance from the convex roller 14 in the direction along the first axis C1; and the concave roller 15 supported so as to enable the outer circumference of the ring member 51 held on the outer circumference of the tube 2 to rotate around the second axis C2 of the tube 2.

As described above, the tube-end positioning member 30 can change the distance from the convex roller 14 in the direction along the first axis C1. Thus, the groove can be formed at an arbitrary position from the tube end 2a.

(3) The form-rolling device 1 further includes: the supporting roller 55 supported rotatably around the fourth axis C4 under the outer circumference of the ring member 51 held on the tube 2; and the supporting member 57.

This can prevent the deviation of the tube 2 during the process.

(4) The supporting member 57 includes the concave supporting rollers 55 that hold the ring member 51 fixed on the tube 2 therebetween. Thus, the tube 2 and the ring member 51 can smoothly be held while the tube 2 and the ring member 51 rotate.

(5) The supporting rollers 55 can move up and down. The supporting rollers 55 are provided at, at least, two circumferential positions on the ring member 51. Thus, various sizes of tube 2 can be held.

(6) The supporting rollers 55 can move in the direction in which the supporting rollers 55 approach or depart from the tube-end positioning member 30. Thus, the tube 2 can be pressed onto the tube-end positioning member 30. Thus, the tube 2 can be stably processed.

(7) The tube-end positioning member 30 can move on the outer circumference of the shaft portion 13 in the direction along the first axis. This movement enables the tube-end positioning member 30 to change the distance from the convex roller 14 in the first axis C1 as described above. The groove can be formed at an arbitrary position from the tube end 2a.

(8) The ring member 51 is detachable from the tube 2. Thus, the ring member 51 can be used for a plurality of tubes 2. This can reduce the cost.

(9) In addition, there are the contact points Q1, Q2, Q3, and Q4 as illustrated in FIG. 4A in the present embodiment. This can maintain the tube 2 in a horizontal position in the early phase of the process. When the process proceeds and the groove is formed to some extent, the groove starts working as a guide. This prevents the currently processed part of the tube 2 from leaning or deviating.

(Exemplary Variation)

An embodiment of the present invention has been described above. However, the present invention is not limited to the embodiment, and can variously be modified within the scope of the invention described in claims. Needless to say, the modifications are also included in the scope of the present invention.

Figure 5A:
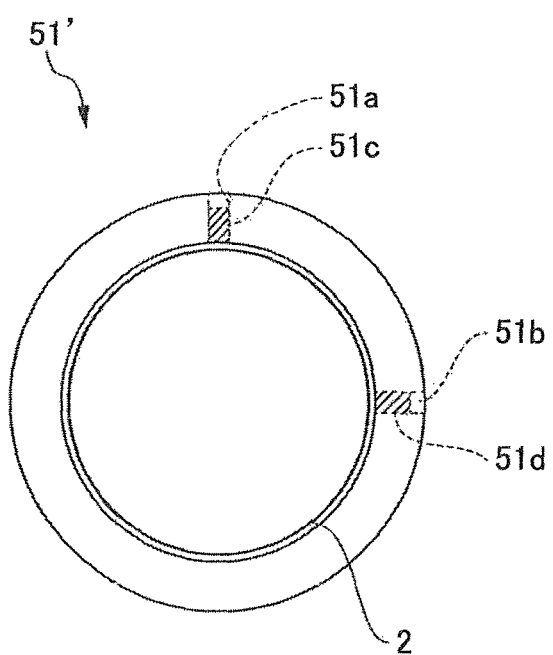
FIG. 5A is a front elevation of an exemplary variation of the ring member.
Figure 5B:
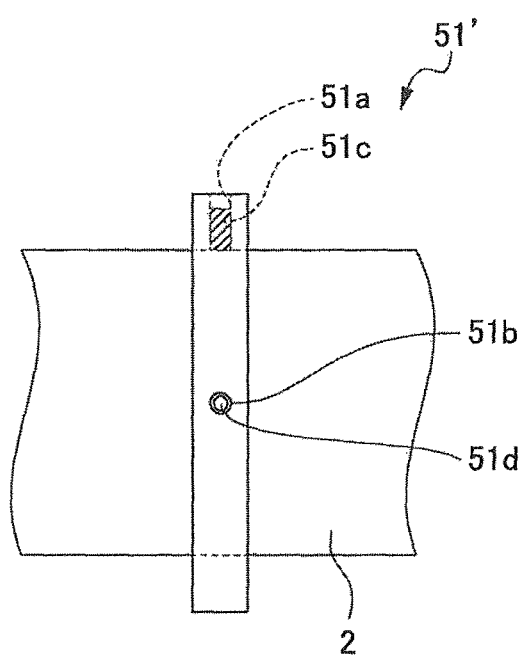
FIG. 5B is a side view of an exemplary variation of the ring member.

Although the ring member 51 of the embodiment is divided into the two semicircular portions 52 and 53, and the semicircular portions 52 and 53 are connected with the bolt 54, the present invention is not limited to the embodiment. FIG. 5A is a front elevation of an exemplary variation of the ring member. FIG. 5B is a side view of an exemplary variation of the ring member.

A ring member 51' according to the exemplary variation is provided with two penetration screw holes 51a and 51b extending from the outer circumference to the inner circumference of the ring member 51'. Long screws 51c and 51d are screwed into the penetration screw holes 51a and 51b, respectively.

The ring member 51' is held on the outer circumference of the tube 2, and the long screws 51c and 51d are screwed into the penetration screw holes 51a and 51b so that the long screws 51c and 51d are pressed onto the tube 2. This pressure can fix the ring member 51' to the tube 2.

In addition, loosening the long screws 51c and 51d can move the ring member 51' to an arbitrary position of the tube 2 in the longitudinal direction (in the front and back direction).

A plurality of ring members 51' is prepared for tubes 2 with different outer diameters also in the present variation. The ring member can be exchanged depending on the dimensions of the tube 2.

The two supporting rollers 55 (the first supporting roller 55A and the second supporting roller 55B) are provided around the ring member 51 in the embodiment described above. However, the present invention is not limited to the embodiment. Only one or more than two supporting rollers 55 may be provided in the circumferential direction of the tube 2 as long as the supporting roller(s) can prevent the tube 2 from deviating in the vertical direction and the longitudinal direction.

An example in which the ring member 51 has a convex cross-sectional surface, and the supporting roller 55 has a concave cross-sectional surface has been described above in the embodiment. However, the present invention is not limited to the embodiment. For example, the ring member 51 may have a concave cross-sectional surface, and the supporting roller 55 may have a convex cross-sectional surface.

An example in which the convex roller 14 is placed on the inner surface of the tube 2, and the concave roller 15 is placed on the outer surface of tube 2 has been described above in the embodiment. However, the present invention is not limited to the example. For example, the convex roller may be placed on the outer surface of the tube 2 and the concave roller be placed on the inner surface of the tube 2.

The drive motor 11 rotates the shaft portion 13 in the embodiment described above. However, the present invention is not limited to the embodiment. The shaft portion 13 may be manually rotated.

In addition, the shaft portion 13 is fixed and the tube-end positioning member 30 is movable with respect to the shaft portion 13 in the embodiment described above. However, the present invention is not limited to the embodiment.

For example, the tube-end positioning member 30 may be fixed to a fixing stage 76b and the convex roller 14 provided to the shaft portion 13 may be movable with respect to the fixing stage 76.

In such an example, the position of the concave roller 15 can be adjusted according to the position of the convex roller 14 because the concave roller 15 is movable in the direction along the first axis C1 in the present embodiment.

Second Embodiment

As described above, rotating the handle 84 moves the moving block 81 in the longitudinal direction in the first embodiment. The longitudinal position of the concave roller 15 is adjusted so that the center of the concave roller 15 is in agreement with the center of the convex roller 14 (in the front and back direction). The form-rolling process is performed while the center of the concave roller 15 is in agreement with the center of the convex roller 14, and the convex portion 20 is formed.

When the center of the concave roller 15 is in agreement with the center of the convex roller 14 as described in the first embodiment, a good convex portion 20 is normally formed. However, the hardness of the material of the tube 2, the speed or intensity of the pressure at which the convex roller 14 is pressed may cause the following phenomenon.

FIGS. 6A, 6B and 6C is an explanatory diagram of a phenomenon that may occur when the center of the concave roller 15 is in agreement with the center of the convex roller 14, and FIGS. 6A, 6B and 6C corresponds to FIGS. 4A, 4B and 4C.

First, as described in the first embodiment, the concave roller 15 is brought into contact with the outer circumference of the tube 2 (the state in FIG. 6A).

The concave roller 15 descends further in the direction in which the concave roller 15 approaches the convex roller 14 while the convex roller 14 is rotated.

When the concave roller 15 descends further after the concave roller 15 is in contact with the tube 2, the concave roller 15 presses the wall surface of the tube 2 inwards at the contact points. This forms a convex portion 20 on the wall surface of the tube 2 as illustrated in FIG. 6B.

The shaft portion 13 rotates around the first axis C1. The convex roller 14 also rotates in synchronization with this rotation, and then the tube 2 also rotates around the third axis C3 that is the center of the tube 2. This rotation forms the convex portion 20 on the whole circumference of the tube 2 as a groove.

Here, the shaft portion 13 is cantilevered. In other words, a tube end of the shaft portion 13 is held on the fixing stage 76 via the bearing portion 12 and the drive motor 11 (see FIG. 1) in the longitudinal direction. However, the opposite tube end (on the longitudinal end) on which the convex roller 14 is attached is not held by anything.

This may cause the shaft portion 13 to incline in the pressure direction in which the concave roller 15 presses the tube 2 (in the downward direction of the drawing) as illustrated in FIG. 6B and FIG. 6C, for example, depending on the hardness of the material of the tube 2, the speed of the pressure at which the convex roller 14 is pressed, or the height of the convex portion 2 to be formed.

Such inclination of the shaft portion 13 makes the distance L2 between the concave roller 15 and the convex roller 14 on the longitudinal end side in the direction along the first axis C1 shorter than the distance L1 between the concave roller 15 and the convex roller 14 on the tube end side as illustrated in FIG. 6C.

Figure 7:
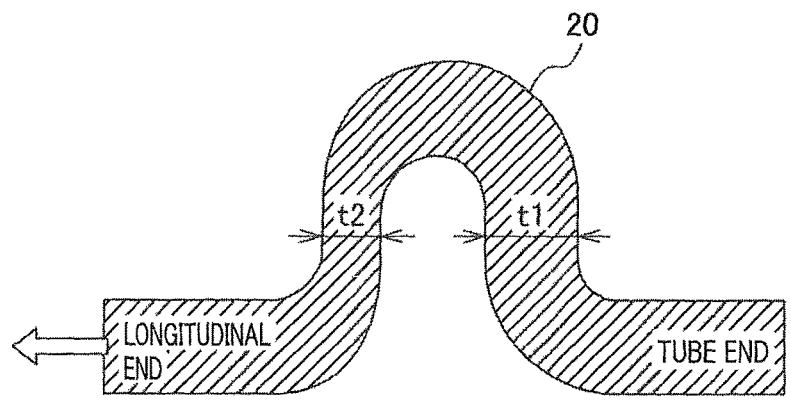
FIG. 7 is a diagram of the shape of a convex portion produced when the distance between the concave roller and the convex roller on the longitudinal end is narrower than the distance between the concave roller and the convex roller on the tube end.

FIG. 7 illustrates the convex portion 20 that may be produced by such inclination. When the distance L2 between the concave roller 15 and the convex roller 14 is shorter than the distance L1 between the concave roller 15 and the convex roller 14 on the tube end side as illustrated in FIG. 7, the thickness t2 of the convex portion 20 on the longitudinal end side of the processed tube 2 is sometimes thinned in comparison with the thickness t1 on the tube end side.

SUS 304 steel tubes (1) with the nominal diameter 80A (outer diameter 90 mm and thickness 3 mm), (2) with the nominal diameter 150A (outer diameter 165 mm and thickness 3.5 mm), and (3) with the nominal diameter 250A (outer diameter 267 mm and thickness 4.0 mm) are used as the tube 2. The convex portion 20 is formed on the SUS 304 steel tubes while the center of the concave roller 15 is in agreement with the center of the convex roller 14. Then, the thicknesses t1 and t2 are actually measured. The following Table 1 shows the measurement results. Note that the convex portions 20 on the tubes (1), (2), and (3) have heights of 6 mm, 8 mm, and 8.5 mm, respectively.

TABLE 1

| Size | Thickness t2 on longitudinal end side (mm) | Thickness t1 on tube end side (mm) | Difference between t1 and t2 Δt (mm) |
|---|---|---|---|
| (1)80A | 1.408 | 2.248 | 0.840 |
| (2)150A | 1.877 | 2.308 | 0.431 |
| (3)250A | 1.827 | 2.378 | 0.551 |

If there is a difference Δt between the thicknesses t1 and t2 as shown in Table 1, the following phenomenon may occur.

Figure 8:
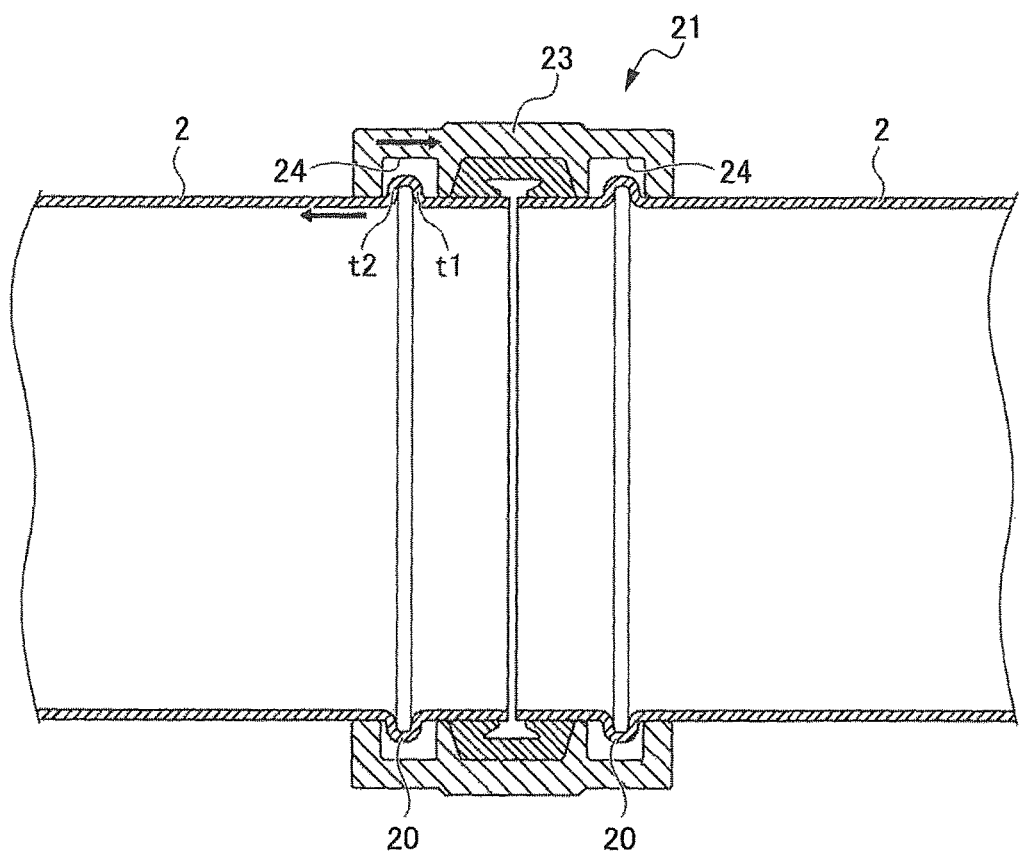
FIG. 8 is a cross-sectional view of a state in which two processed tubes are connected.

FIG. 8 is a cross-sectional view of a state in which two tubes 2 are connected. As illustrated, the two tubes 2 are connected and fixed with a housing-shaped tube joint 21. In such a case, the convex portion 20 is engaged outwardly with the inner circumference opening groove 24 of a housing 23. If force acts on the two connected tubes 2 in the direction in which the two tubes depart from each other as illustrated in FIG. 8, the strength of the thinner side (thickness t2) of the convex portion 20 is reduced. This reduction in strength may cause a crack.

Figure 9B:
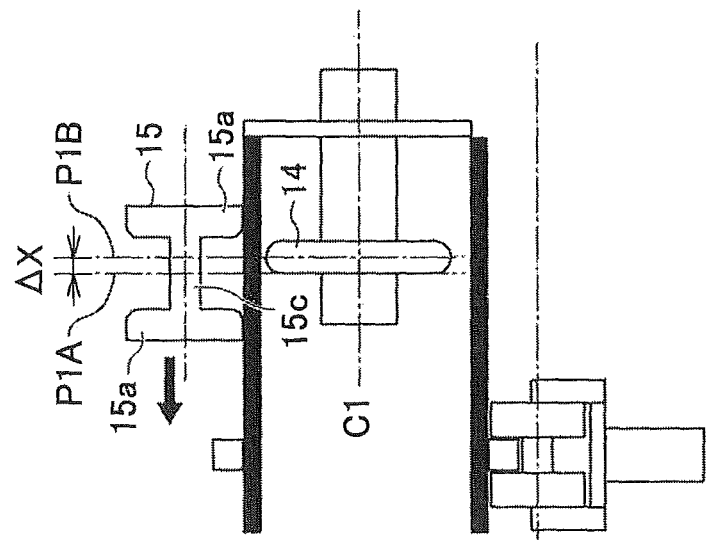
FIG. 9B is an explanatory diagram of the movement of the concave roller by a moving mechanism.
Figure 9A:
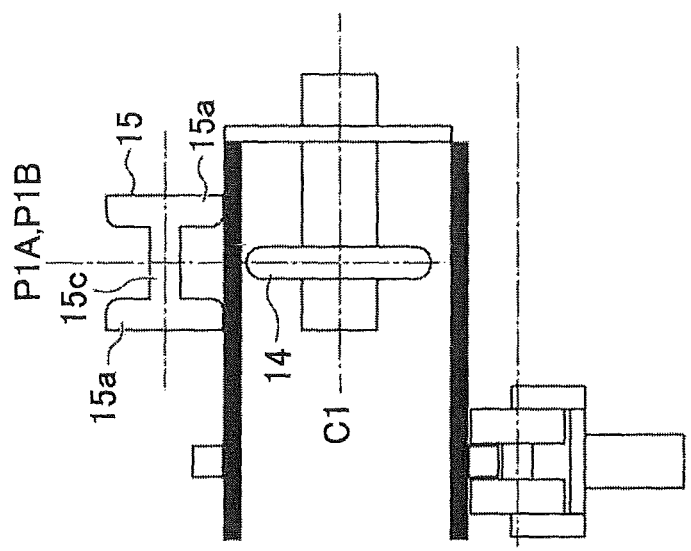
FIG. 9A is an explanatory diagram of the movement of the concave roller by a moving mechanism.

In light of the foregoing, a moving mechanism 80 (illustrated in FIG. 1) moves the concave roller 15 in the second embodiment so as to change the state illustrated in FIG. 9A to the state illustrated in FIG. 9B. Then, the center P1A of the concave roller 15 is deviated from the center P1B of the convex roller 14. Note that, although the concave roller 15 is moved relative to the convex roller 14 in the present embodiment, the present invention is not limited to the present embodiment. The convex roller 14 may be moved relative to the concave roller 15. Both of the concave roller 15 and the convex roller 14 need to move relative to each other. In addition, for example, the circular disks 15a provided on both ends of the rotary shaft 15c of the concave roller 15 are formed into unsymmetrical shapes. Changing the longitudinal direction along the first axis C1 may cause the center P1A of the concave roller 15 to deviate from the center P1B of the convex roller 14.

FIG. 10 is a schematic cross-sectional view of a form-rolling device 1A according to the second embodiment.

Differently from the first embodiment, the form-rolling device 1A of the second embodiment includes a position detecting device 100 and a tube end supporting unit 110. The other components of the second embodiment are similar to those of the first embodiment. Thus, the descriptions of the similar components will be omitted.

The position detecting device 100 includes a longitudinal position detecting unit 100X (in the X direction) and a vertical position detecting unit 100Y (in the Y direction).

For example, the position detecting unit 100X can detect the position of the position detecting unit 100X measured with a scale (not illustrated) provided on the rail 85.

The rail 85 is fixed to the grooving mechanism 10 and the frame 70. Thus, the position detecting unit 100X can detect the amount of movement of the convex roller 14 relative to the concave roller 15, in other words, a deviation amount ΔX between the center P1A of the concave roller 15 and the center P1B of the convex roller 14 while the positions of the tube-end positioning member 30 and the convex roller 14 are fixed relative to the grooving mechanism 10.

On the other hand, the position detecting unit 100Y can detect, for example, the position of the cylinder rod 17a relative to the cylinder tube 17b.

(Tube End Supporting Unit)

Figure 11:
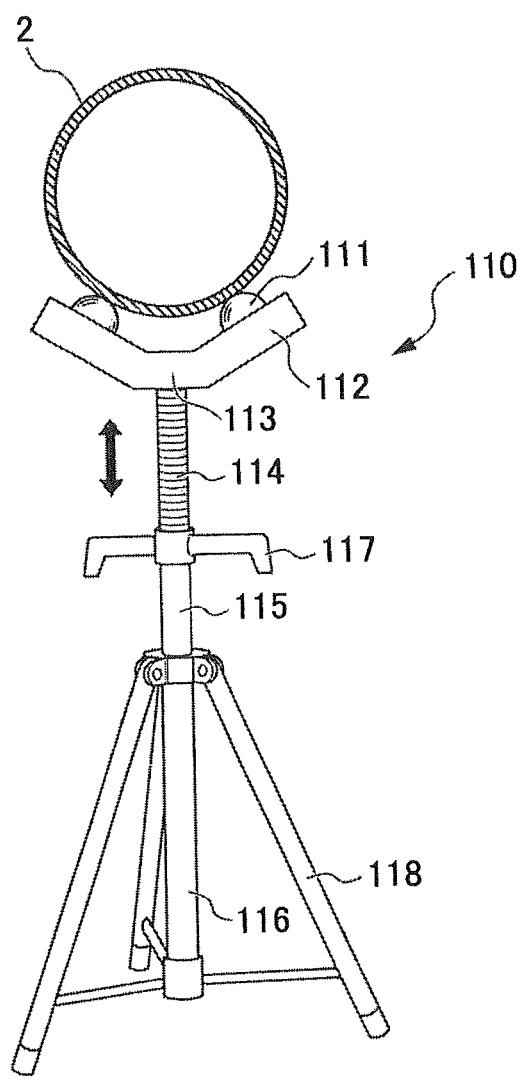
FIG. 11 is a diagram of a tube end supporting unit.

FIG. 11 is a diagram of the tube end supporting unit 110, viewed from the front in the direction perpendicular to FIG. 10 (the left of FIG. 10). The tube end supporting unit 110 includes two bearings 111 and two board members 112 that rotatably hold the bearings 111, respectively. The two board members 112 are connected and formed into an L-shape. A supporting shaft 114 extends from the lower part of a connected part 113 of the two board members 112. The lower end of the supporting shaft 114 is inserted in a supporting pole 115. The supporting pole 115 is inserted in the holding pole 116 provided on the lower end of the supporting pole 115.

Rotating a jack 117 provided on the upper end of the supporting pole 115 moves the supporting shaft 114 up and down with respect to the supporting pole 115. The supporting pole 115 is stretchable with respect to the holding pole 116. The tube end supporting unit 110 is further provided with three legs 118 for vertically holding the holding pole 116. The tube end supporting unit 110 is placed nearer to the front end than the center of the tube 2.

The position detecting unit 100X of the form-rolling device 1A of the second embodiment can detect the deviation amount ΔX between the convex roller 14 and the concave roller 15 as described above.

The following table shows: the results of measurement of the thicknesses t1 (mm) on the tube end sides and the thicknesses t2 (mm) on the longitudinal end sides after SUS 304 steel tubes (1) with the nominal diameter 80A (outer diameter 90 mm and thickness 3 mm), (2) with the nominal diameter 150A (outer diameter 165 mm and thickness 3.5 mm), and (3) with the nominal diameter 250A (outer diameter 267 mm and thickness 4.0 mm) are prepared as the tubes 2 as described above, and the convex portions 2 are formed while the deviation amount ΔX is varied; and the values of the differences Δt between t1 and t2 found from the results.

TABLE 2

| Size | ΔX | Thickness t2 on longitudinal end side (mm) | Thickness t1 on tube end side (mm) | Difference between t1 and t2 Δt (mm) |
|---|---|---|---|---|
| (1)80A | 0.0 | 1.408 | 2.248 | 0.840 |
| | 0.2 | 1.561 | 2.037 | 0.476 |
| | 0.4 | 1.586 | 2.069 | 0.483 |
| | 0.6 | 1.710 | 1.912 | 0.202 |
| | 0.7 | 1.699 | 1.857 | 0.158 |
| | 0.8 | 1.740 | 1.839 | 0.099 |
| | 0.9 | 1.750 | 1.826 | 0.076 |
| (2)150A | 0.0 | 1.877 | 2.308 | 0.431 |
| | 0.2 | 1.871 | 2.291 | 0.420 |
| | 0.4 | 1.923 | 2.204 | 0.281 |
| | 0.6 | 1.960 | 2.189 | 0.229 |
| | 0.7 | 2.016 | 2.151 | 0.135 |
| | 0.8 | 1.996 | 2.135 | 0.139 |
| | 0.9 | 2.026 | 2.072 | 0.046 |
| | 1.0 | 2.007 | 2.018 | 0.011 |
| (3)250A | 0.0 | 1.827 | 2.378 | 0.551 |
| | 0.2 | 1.831 | 2.337 | 0.506 |
| | 0.4 | 1.895 | 2.273 | 0.378 |
| | 0.6 | 1.961 | 2.189 | 0.228 |
| | 0.7 | 2.005 | 2.142 | 0.137 |
| | 0.8 | 1.976 | 2.143 | 0.167 |
| | 0.9 | 1.973 | 2.146 | 0.173 |
| | 1.0 | 1.986 | 2.099 | 0.113 |

Figure 12:
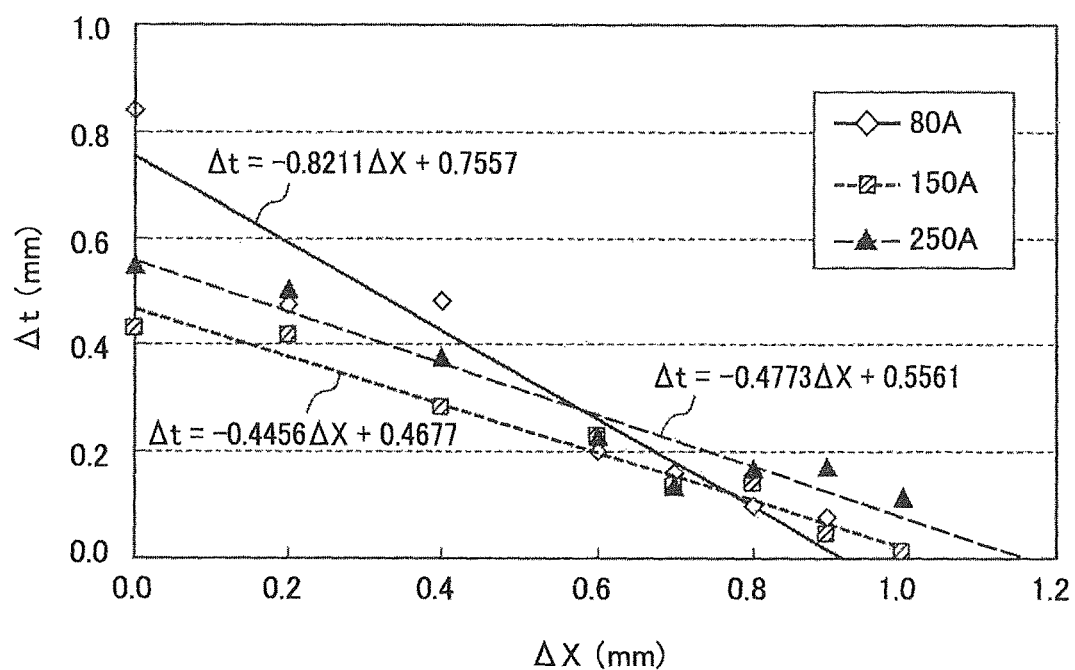
FIG. 12 is a graph showing the results of Table 2.

FIG. 12 is a graph of the results in Table 2.

Table 2 and the graph in FIG. 12 show that the difference Δt of the tube (1) with the nominal diameter 80A is approximately zero when the deviation amount ΔX is around 0.9 mm, the difference Δt of the tube (2) with the nominal diameter 150A is approximately zero when the deviation amount ΔX is around 1.0 mm, and the difference Δt of the tube (3) with the nominal diameter 250A is approximately zero when the deviation amount ΔX is around 1.2 mm.

To find the deviation amount ΔX with which the difference Δt becomes approximately zero, a plurality of test tubes 2 is first processed in the form-rolling process while the deviation amount ΔX is varied.

Then, the thicknesses t1 on the tube end sides and the thicknesses t2 on the longitudinal end sides of the convex portions 20 of the tubes 2, which are formed while the deviation amount ΔX is varied, are measured.

From the measurement, it may be concluded that the difference Δt is approximately a linear function of the deviation amount ΔX as illustrated in FIG. 12. Thus, the functions of the differences Δt with respect to the deviation amounts ΔX found with at least two test tubes 2 are calculated.

Then, the deviation amount ΔX1 at which the difference Δt becomes zero is found from the function. Then, the concave roller 15 is placed at a position deviating from the convex roller 14 by the deviation amount ΔX1. Then, in that state, the form-rolling device 1 performs the form-rolling process.

FIGS. 13A, 13B and 13C is an explanatory diagram of the operation of the form-rolling device 1A in which the center P1A of the concave roller 15 is deviated from the center P1B of the convex roller 14 by the deviation amount ΔX1 at which the difference Δt becomes zero.

First, the concave roller 15 is brought into contact with the outer circumference of the tube 2 as described in the first embodiment (the state illustrated in FIG. 13A).

The concave roller 15 descends further in the direction in which the concave roller 15 approaches the convex roller 14 while the convex roller 14 is rotated.

When the concave roller 15 descends further after the concave roller 15 is in contact with the tube 2, the concave roller 15 presses the wall surface of the tube 2 inwards at the contact points, and this pressure forms the convex portion 20 on the wall surface of the tube 2 as illustrated in FIG. 13B.

The shaft portion 13 rotates around the first axis C1. The convex roller 14 also rotates in synchronization with this rotation, and then the tube 2 also rotates around the third axis C3 that is the center of the tube 2. This rotation forms the convex portion 20 on the whole circumference of the tube 2 as a groove.

In this case, the shaft portion 13 is inclined. However, the deviation amount ΔX1 is set at the value at which the difference Δt becomes zero. Thus, the thickness t1 on the tube end side and the thickness t2 on the longitudinal end side of the convex portion 20 of the processed tube 2 are approximately identical.

Thus, the strength of the convex portion 20 is not unbalanced because the thickness t1 on the tube end and the thickness t2 on the longitudinal end are approximately identical according to the present embodiment. Thus, if the two tubes 2 are connected with the housing-shaped tube joint 21 and force acts on both of the tubes 2 in the direction in which both of the tubes 2 depart from each other, the possibility that the convex portion 20 is cracked is reduced.

According to the present embodiment, the form-rolling device 1A includes the position detecting units 100X and 100Y, and thus can accurately determine the position between the concave roller 15 and the convex roller 14. This makes it easy to adjust the deviation amount ΔX1 at which the difference Δt becomes zero, and thus makes it easy to make the difference Δt zero.

The tube 2 is also cantilevered. When the tube 2 is cantilevered and has a long length, the end (the left and front end in the drawings) that is not supported by the convex roller 14 may be warped under its own weight. However, the present embodiment includes the tube end supporting unit 110.

The bearings 111 of the tube end supporting unit 110, which holds the tube 2, can move up and down with a jack through the supporting shaft 114. Thus, the bearings 111 can hold the side surfaces of the tubes 2 with different diameters so as to maintain the tubes 2 in a horizontal position before the form-rolling process. Thus, the tube 2 is maintained in a horizontal position during the form-rolling process, and this prevents the tube, for example, from deforming during the form-rolling process. The tube 2 held by the bearing 111 can easily move in the longitudinal direction. This also makes it easy to attach the tube 2 to the form-rolling device 1A.

Note that, although the deviation amount ΔX1 is adjusted to a value at which the difference Δt becomes zero in the present embodiment, the present invention is not limited to the embodiment. In other words, the deviation amount ΔX1 may be adjusted to a value at which the difference Δt becomes a negative value, in other words, at which the thickness t2 (mm) on the longitudinal end side is thicker than the thickness t1 (mm) on the tube end side. This can increase the strength of the convex portion 20 when force acts on the two connected tubes 2 in the direction in which the two tubes depart from each other.

EXPLANATION OF REFERENCE NUMERALS

C1 First axis
C3 Third axis
1 Form-rolling device
2 Tube to be processed
10 Grooving mechanism
11 Drive motor
13 Shaft
14 Convex roller
15 Concave roller
16 Concave roller holding unit
17 Cylinder
30 Tube-end positioning member
50 Tube supporting mechanism
51 Ring member
52 Semicircular portion
53 Semicircular portion
55 Supporting roller
57 Roller supporting unit
59 Circular cylinder member
70 Frame
80 Moving mechanism
100X, 100Y Position detecting unit
110 Tube end supporting unit

The invention claimed is:

1. A form-rolling device for processing a tubular member, the device comprising:
a shaft rotatable around a first axis;
a first grooving portion that protrudes from an outer circumference of the shaft outwardly along a circumference around the first axis, and has an outward convex cross-sectional shape taken along a plane including the first axis;
a second grooving portion that is rotatable around a second axis parallel to the first axis, has a concave cross-sectional shape taken along a plane passing through the first axis and the second axis, is structured to be placed at a position corresponding to the first grooving portion in the direction along the first axis, and is structured to move in a direction in which the second grooving portion approaches or departs from the first grooving portion;

a flange-shaped tube-end positioning member that is attached to a position of the outer circumference of the shaft nearer to a base end than the first grooving portion, and is structured to change a distance from the first grooving portion in a direction along the first axis; and a supporting roller that supports an outer circumference of a ring member held on an outer circumference of the tubular member to be processed so that the ring member is able to rotate around a third axis, and the third axis is an axis of the tubular member; and the second grooving portion is slidable relative to the tube-end positioning member in the direction along the first axis.

2. The form-rolling device according to claim 1, wherein the supporting roller is provided with a concave portion, the rotary shaft of the supporting roller is parallel to the third axis, and the supporting roller supports the ring member having an rectangular shaped cross section between the concave portion from the outer circumference of the ring member.

3. The form-rolling device according to claim 2, wherein the supporting roller is structured to move up and down relative to the first axis, and is provided at, at least, two places in a capable circumferential direction of the ring member.

4. The form-rolling device according to claim 2, wherein the supporting roller is structured to change a distance from the tube-end positioning member during the form-rolling process.

5. The form-rolling device according to claim 1, wherein the tube-end positioning member is structured to move on the outer circumference of the shaft in the direction along the first axis.

6. The form-rolling device according to claim 1, wherein the form rolling device is structured such that a relative position of a center of the concave shape of the second grooving portion in the direction along the first axis relative to a center of the convex shape of the first grooving portion in the direction along the first axis changes in the direction along the first axis.

7. The form-rolling device according to claim 1, further comprising:

a position detecting device structured to measure the relative position between the second grooving portion and the first grooving portion.

8. The form-rolling device according to claim 1, wherein the ring member is detachable from the tubular member.

* * * * *